United States Patent
Bieschke

(10) Patent No.: US 10,368,114 B2
(45) Date of Patent: Jul. 30, 2019

(54) MEDIA CHANNEL CREATION BASED ON FREE-FORM MEDIA INPUT SEEDS

(71) Applicant: Pandora Media, Inc., Oakland, CA (US)

(72) Inventor: Eric Kenson Bieschke, San Francisco, CA (US)

(73) Assignee: Pandora Media, LLC, Oakland, CA (US)

( * ) Notice: Subject to any disclaimer, the term of this patent is extended or adjusted under 35 U.S.C. 154(b) by 92 days.

(21) Appl. No.: 15/210,721

(22) Filed: Jul. 14, 2016

(65) Prior Publication Data

US 2017/0041656 A1     Feb. 9, 2017

Related U.S. Application Data

(60) Provisional application No. 62/201,035, filed on Aug. 4, 2015.

(51) Int. Cl.
| | |
|---|---|
| *H04N 21/262* | (2011.01) |
| *H04N 21/482* | (2011.01) |
| *H04N 21/475* | (2011.01) |
| *H04N 21/439* | (2011.01) |
| *H04N 21/84* | (2011.01) |
| *H04N 21/61* | (2011.01) |

(52) U.S. Cl.
CPC ..... *H04N 21/26258* (2013.01); *H04N 21/439* (2013.01); *H04N 21/4756* (2013.01); *H04N 21/4825* (2013.01); *H04N 21/6125* (2013.01); *H04N 21/84* (2013.01)

(58) Field of Classification Search
None
See application file for complete search history.

(56) References Cited

U.S. PATENT DOCUMENTS

| | | | | |
|---|---|---|---|---|
| 7,836,057 | B1 * | 11/2010 | Micaelian | G06F 17/30867 707/748 |
| 9,578,374 | B1 * | 2/2017 | Whitten | H04N 21/4627 |
| 2002/0194585 | A1 * | 12/2002 | Connelly | H04N 5/44543 725/9 |
| 2004/0194141 | A1 * | 9/2004 | Sanders | G06F 17/30817 725/53 |

(Continued)

FOREIGN PATENT DOCUMENTS

| | | | | |
|---|---|---|---|---|
| GB | 2455331 | A * | 6/2009 | G06F 17/30029 |
| WO | WO 2014039784 | A1 * | 3/2014 | G06F 17/3053 |

OTHER PUBLICATIONS

PCT International Search Report and Written Opinion for PCT/US2016/043423, dated Oct. 20, 2016, 11 Pages.

*Primary Examiner* — Jason K Lin
(74) *Attorney, Agent, or Firm* — Fenwick & West LLP

(57) ABSTRACT

A content server generates a media channel including a plurality of media items. A request for a media channel is received from a client device of a user, the request including a free-form media input seed identifying a plurality of ambiguous entities. A plurality of media playlists of media items is determined where each media playlist is associated with a corresponding one of the plurality of ambiguous entities identified by the free-form media input seed. The plurality of media playlists are combined into the media channel that includes media items selected from among the plurality of media playlists. The media channel is provided to the client device.

15 Claims, 6 Drawing Sheets

(56) References Cited

U.S. PATENT DOCUMENTS

| | | | |
|---|---|---|---|
| 2005/0217459 A1 | 10/2005 | Murakoshi | |
| 2007/0174872 A1* | 7/2007 | Jing | H04N 5/44543 |
| | | | 725/46 |
| 2008/0222106 A1* | 9/2008 | Rao | H04H 60/46 |
| 2009/0063414 A1* | 3/2009 | White | G06F 17/30017 |
| 2009/0138505 A1* | 5/2009 | Purdy | G06F 17/30743 |
| 2010/0325135 A1* | 12/2010 | Chen | G06F 17/30053 |
| | | | 707/759 |
| 2012/0303650 A1 | 11/2012 | Aravamudan et al. | |
| 2013/0070093 A1* | 3/2013 | Rivera | G11B 27/002 |
| | | | 348/143 |
| 2014/0068676 A1 | 3/2014 | Lin et al. | |
| 2014/0115462 A1* | 4/2014 | Reznor | H04M 1/72522 |
| | | | 715/716 |
| 2014/0149373 A1 | 5/2014 | Annau et al. | |
| 2014/0317099 A1 | 10/2014 | Jain et al. | |
| 2015/0178280 A1* | 6/2015 | DiMaria | H04L 65/60 |
| | | | 707/736 |
| 2015/0186934 A1* | 7/2015 | Van Deventer | G06Q 30/0631 |
| | | | 705/14.49 |

* cited by examiner

US 10,368,114 B2

MEDIA CHANNEL CREATION BASED ON FREE-FORM MEDIA INPUT SEEDS

CROSS REFERENCE TO RELATED APPLICATION

This application claims the benefit of U.S. Provisional Application No. 62/201,035, filed on Aug. 4, 2015, which is incorporated by reference in its entirety.

BACKGROUND

Field of Disclosure

The present disclosure generally relates to the delivery of content, and more specifically to ways of generating media channels for users based on free-form media input seeds received from the users.

Description of the Related Art

Many users utilize their digital devices to consume media content. For example, a user may use a media application on their digital device to play a media item (e.g., a song) provided by a media content provider. In some instances, the media content provider may generate a playlist for a user based on a media input seed received from the user through the media application. The media input seed describes the type of media items that the user wishes to receive from the media content provider. However, it is difficult for the media content provider to provide the types of media items desired by the user when the media input seed is ambiguous.

SUMMARY

The above and other needs are met by a computer-implemented method, a non-transitory computer-readable storage medium storing executable code, and a device for generating a media channel including a plurality of media items.

One embodiment of the computer-implemented method for generating a media channel including a plurality of media items comprises receiving a request for a media channel from a client device of a user, the request including a free-form media input seed identifying a plurality of ambiguous entities. A plurality of media playlists of media items is determined where each media playlist is associated with a corresponding one of the plurality of ambiguous entities identified by the free-form media input seed. The plurality of media playlists are combined into the media channel that includes media items selected from among the plurality of media playlists. The media channel is provided to the client device.

One embodiment of a non-transitory computer-readable storage medium storing executable computer program instructions for generating a media channel including a plurality of media items comprises instructions for receiving a request for a media channel from a client device of a user, the request including a free-form media input seed identifying a plurality of ambiguous entities. The medium also includes instructions for determining a plurality of media playlists of media items where each media playlist is associated with a corresponding one of the plurality of ambiguous entities identified by the free-form media input seed. The medium also includes instructions for combining the plurality of media playlists into the media channel that includes media items selected from among the plurality of media playlists. The media channel is provided to the client device.

One embodiment of a device for generating a media channel including a plurality of media items, comprises a processor configured to execute modules and a memory storing the modules, the modules executable by the processor to perform steps comprising receiving a request for a media channel from a client device of a user, the request including a free-form media input seed identifying a plurality of ambiguous entities. The steps also include determining a plurality of media playlists of media items where each media playlist is associated with a corresponding one of the plurality of ambiguous entities identified by the free-form media input seed. The steps also include combining the plurality of media playlists into the media channel that includes media items selected from among the plurality of media playlists. The media channel is provided to the client device

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
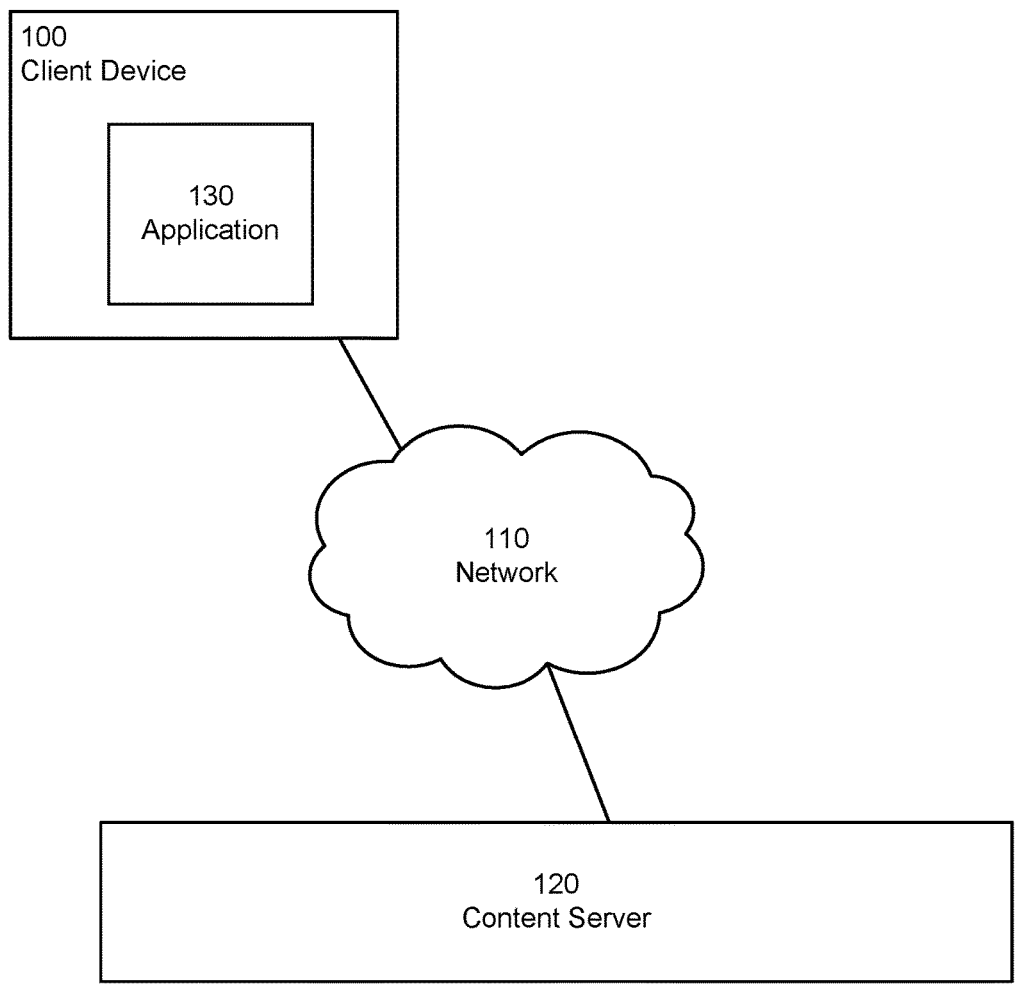
FIG. 1 is a high-level block diagram illustrating an embodiment of an environment for generating media playlists based on free-form media input seeds.

FIG. 1 is a high-level block diagram illustrating an embodiment of an environment for generating playlists based on free-form media input seeds received from client devices of users. The environment includes a client device 100 connected by a network 110 to a content server 120. Here only one client device 100 and content server 120 are illustrated but there may be multiple instances of each of these entities. For example, there may be thousands or millions of client devices 100 in communication with one or more content servers 120.

The network 110 provides a communication infrastructure between the client devices 100 and the content servers 120. The network 110 is typically the Internet, but may be any network, including but not limited to a Local Area Network (LAN), a Metropolitan Area Network (MAN), a Wide Area Network (WAN), a mobile wired or wireless network, a private network, or a virtual private network.

The client devices 100 are computing devices such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices 100 include the hardware and software needed to input and output sound (e.g., speakers and microphone) and images, connect to the network 110 (e.g., via Wifi and/or 4G or other wireless telecommunication standards), determine the current geographic location of the client devices 100 (e.g., a Global Positioning System (GPS) unit), and/or detect motion of the client devices 100 (e.g., via motion sensors such as accelerometers and gyroscopes).

The client device 100 includes an application 130 that allows interaction with the content server 120. For example, the application 130 could be a browser that allows a user of the client device 100 to obtain content by browsing a web site of the content server 120. As another example, the application 130 could be a dedicated application specifically designed (e.g., by the organization responsible for the content server 120) to enable interactions with the content server 120 and its content.

The application 130 presents media items responsive to a user selecting and/or creating a media channel. A media channel is one or more playlists of media items that are grouped together. A media item is a form of media content and is characterized by a set of media features that describe musicological features of the item (e.g., gender of singer, tempo, style). In one embodiment referred to throughout the remainder of the specification, the media item is audio content, such as a song, piece of music, or audio recording. It is appreciated, however, that in other embodiments a media item alternatively and/or additionally include other forms of digital content, such as a video, movie, slideshow, or image. Thus, subsequent references to the media item or other audio-related terminology could equally apply to (for example) viewing videos or otherwise experiencing media provided by the content server system 100 in other embodiments. The application 130 requests content associated with the requested media channel from the content server 120. The application 130 receives media items (e.g., the media item is streamed) associated with the requested media channel and presents the media items to the user.

The content server 120 generates a media channel that is specific to a user of the client device 100. The content server 120 may initially generate a media channel based on a media input seed received from the user. The content server 120 receives a request for content from a client device 100, where the request includes the media input seed. In one embodiment, the content server 120 identifies an existing media channel associated with the request for content based on the media input seed, and streams media items associated with the media channel to the requesting client device 100. In another embodiment, the content server 120 creates a media channel specific to a user of the client device 100 based on the media input seed included in the request for content received from the client device 100.

In one embodiment, the media input seed can be a restricted expression or a free-form expression. A restricted expression specifies only one or more entities from a set of valid entity types related to the media items. For example, in the music context the valid entity types may include a specific song title, artist name, album title, music genre, musicological feature, or composer name. These valid entity types have explicit meaning within the music context. For example, a song title refers to a specific song and an artist name refers to a specific artist. The content server 120 may force the user to provide the media input seed as a restricted expression in order to force the user to provide an explicit reference to one or more of the valid entity types.

A free-form expression, in contrast, can contain valid entity types as well as ambiguous entities. An ambiguous entity is a term in the expression that does not identify an entity within the set of valid entity types related to the media items, such as nouns, adjectives, or verbs that do not describe a valid entity. For example, the free-form expression "morning music in September" does not identify a specific song title, artist name, album title, music genre, or composer name. Rather, the terms "morning" and "September" are ambiguous entities since it is unclear what music is of interest to the user based on these terms. Likewise, the free-form expression "morning jazz in September" is a free-form expression because it contains the aforementioned ambiguous entities in addition to a valid entity type (i.e., "jazz").

As used herein, the term free-form media input seed refers to a free-form expression provided by a user as a media input seed. As described below, the content server 120 generates a media channel that is specific to a user of the client device 100 in response to a free-form media input seed received from the user. In the context of the description herein, any further reference to a media input seed refers to a free-form media input seed unless specified otherwise.

Figure 2A:
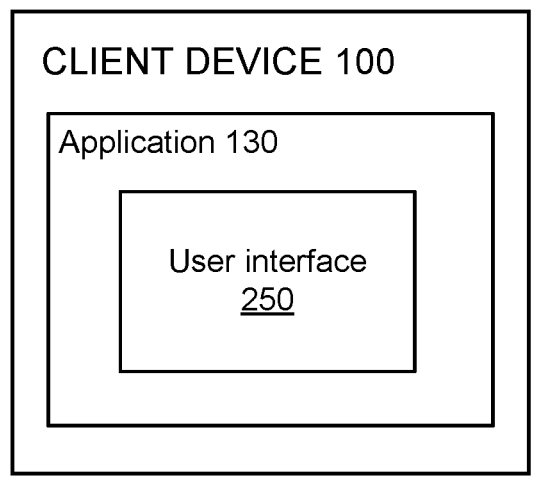
FIG. 2A is a high-level block diagram illustrating a detailed view of a client device of FIG. 1, according to one embodiment.
Figure 2B:
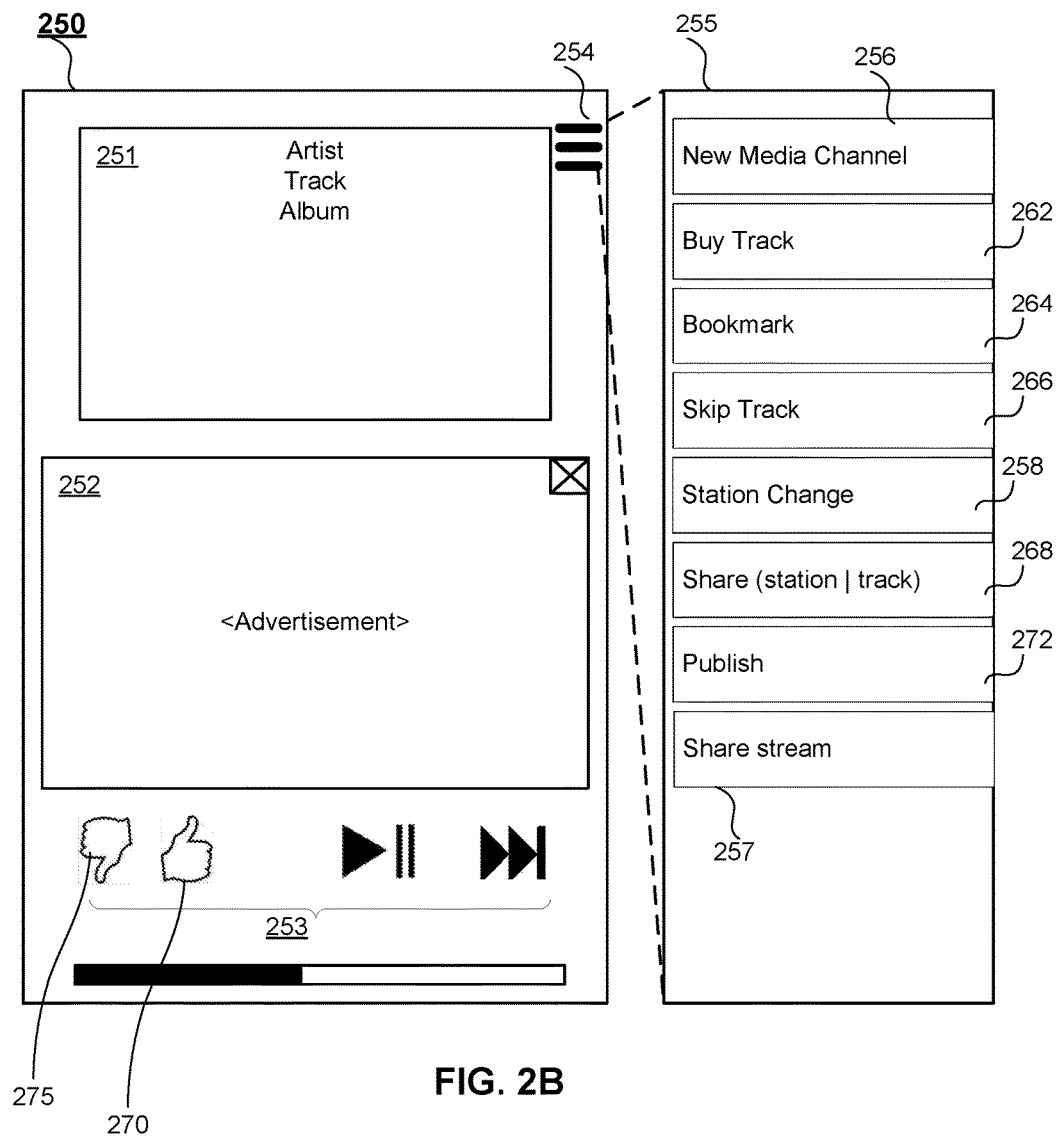
FIG. 2B is an example user interface provided by the application of FIGS. 1 and 2A, according to one embodiment.

The client device 100 and content server 120 are now described in more detail with respect to FIGS. 2A, 2B and 3, below. FIG. 2A is a high-level block diagram illustrating a detailed view of a client device 100 of FIG. 1, according to one embodiment.

The client device 100 includes an application 130 specifically designed to operate with the content server 120. For example, in one embodiment the application includes a user interface 250 for interacting with an audio stream, as illustrated in FIG. 2B. The example user interface 250 includes a description area 251 providing information on a currently-playing song, an optional image advertisement 252, controls 253 for registering appreciation for (via a thumbs up button 270), or dislike of (via a thumbs down button 275), the song currently playing, and to pause/play or skip the current song. The thumbs up button 270 and the thumbs down button 275 enable the user to provide express feedback about the media item being presented.

The example user interface 250 also includes a set of options 255 (shown in response to selection of popup control 254) that include an option 256 to request a media channel that includes songs (tracks) associated with the media channel. In response to receiving a selection of option 256, the application 130 displays a query field where the user can input a free-form media input seed describing a media channel desired by the user. The set of options 255 also include an option 257 to share a stream with other nearby users of the content server 120 so that the other users can also (for example) react to the currently-playing song, such as registering appreciation for, or dislike of, the song, sharing the song, bookmarking the song, or the like. The set of options 255 also include an option 258 to change to a different station (i.e., media channel), an option 262 to buy the track currently being played, an option 264 to bookmark the track for subsequent playback, an option 266 to skip the track, an option to share the station or track 268 with other users of the content server 120, and an option to publish 272 the track such as to a social networking system.

Figure 3:
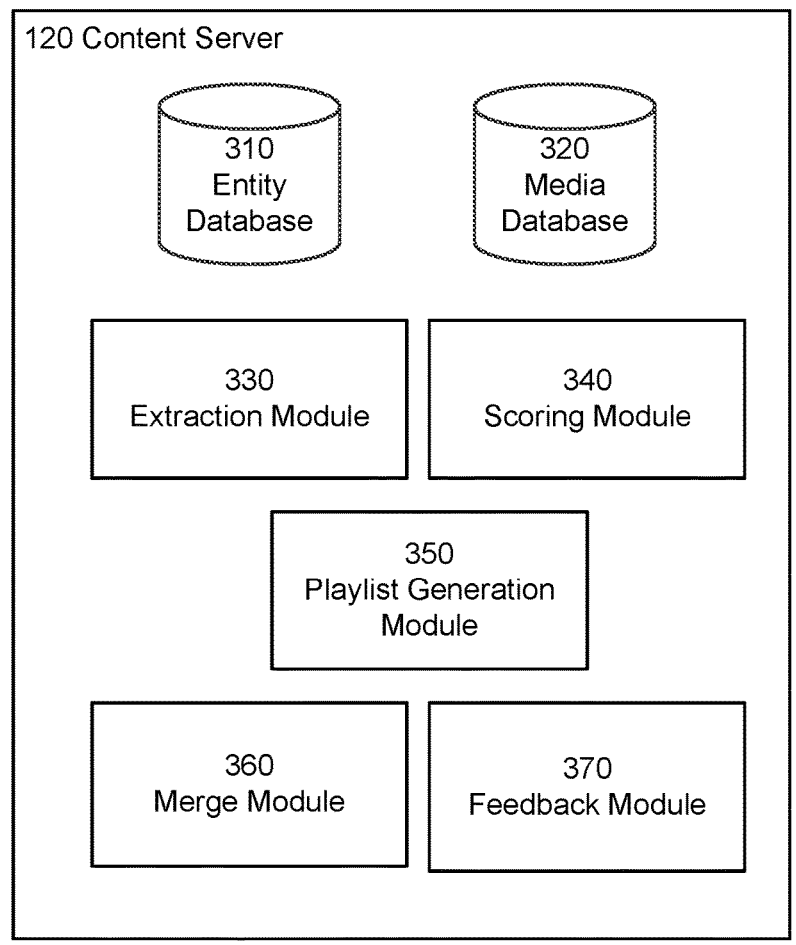
FIG. 3 is a high-level block diagram illustrating a detailed view of the content server of FIG. 1, according to one embodiment.

Turning now to a discussion of the structure of the content server 120, FIG. 3 is a high-level block diagram illustrating a detailed view of modules within the content server 120 according to one embodiment. Some embodiments of the content server 120 have different modules than those described here. Similarly, the functions can be distributed among the modules in a different manner than is described here. The content server 120 is comprised of modules including an entity database 310, a media database 320, an extraction module 330, a scoring module 340, a playlist generation module 350, a merge module 360, and a feedback module 370.

The entity database 310 stores a record of entities (e.g., ambiguous entities and valid entities) received in media input seeds. In one embodiment, each entity is associated with an entity score. An entity's entity score is indicative of the importance or weight of the entity included in the media input seed. In one embodiment, an entity score is a value between 0 and 1. Generally, an entity with a higher entity score has more influence on the media items included in the resulting media channel compared to an entity with a lower entity score. For example, the entity score for the ambiguous entity "morning" may have a value of 0.5 and the entity score for the ambiguous entity "September" may have a value of 0.6. The values of the entity scores indicates that the resulting media channel will have more media items related to the ambiguous entity "September" than media items related to the ambiguous entity "morning" due to "September" having a higher entity score than "morning."

The media database 310 stores information relating to media items, such as the media items and associated metadata (e.g., artist, name of track, etc.), playlists, and mappings of media items to media features. The media features (also referred to as musicological features) describe musicological characteristics of media items. For example, if the media item is a song, the media features of the song may indicate the underlying musicological characteristics of the song such as the gender of the singer, the type of background vocals, the tempo, the quality of the tones (e.g., pure or distorted), whether the melody dominates the composition, and an amount of gospel influence. A given media item may have many media features, such as 100-500 media features. In one embodiment, the mapping of media items to media features is established using the MUSIC GENOME PROJECT database created by PANDORA MEDIA, INC. of Oakland, Calif.

The media database 310 also stores media item scores for media items and correlated entities. Each media item may be correlated with one or more entities (e.g., ambiguous or valid entities). The media database 310 stores a predetermined media item score for each pair formed by a media item and an entity correlated with the media item. In one embodiment, the media item score for a media item and entity pair indicates the magnitude of the media item's relevance to the entity. Thus, each media item has multiple media item scores describing the media item's relevance to each of the multiple entities with which the item is correlated. In one embodiment, a media item score is a value between 0 and 1. For example, a particular song may have a first media item score of 0.9 for the ambiguous entity "morning" indicating that the song is highly relevant to the ambiguous entity "morning" and may have a second media item score of 0.3 for the ambiguous entity "September" indicating that the song is less relevant to the ambiguous entity "September."

The extraction module 330 extracts entities from media input seeds. The extraction module 330 extracts both valid entities and ambiguous entities from the text of free-form media input seeds. In one embodiment, the extraction module 330 parses the text of each media input seed received from client devices and thereby collects one or more words included in the media input seed. The extraction module 330 may isolate character strings separated by spaces to determine the words within the media input seed. The extraction module 330 filters the words to eliminate stop words and other blacklisted words. For example, the extraction module 330 removes a set of predetermined stop words unlikely to convey substantive meaning, such as articles and prepositions like "a," "the," "in," and "of" as well as any blacklisted words such as "music." The extraction module 330 classifies the remaining words in the media input seed as either a valid entity or an ambiguous entity. In one embodiment, the extraction module 330 may classify a word as a valid entity based on a list of valid entities known to the content server 120. The list of valid entities would include entities known to be valid such as music genre names, artist names, song titles, album titles, etc. The extraction module 330 classifies any words that are not included in the list of valid entities as an ambiguous entity.

The scoring module 340 identifies entity scores for entities extracted from free-form media input seeds. For each entity identified in a free-form media input seed (e.g., any ambiguous entities and/or valid entities), the scoring module 340 determines whether the entity already has an associated entity score in the entity database 310. For the entities included in the free-form media input seed that already have an associated entity score, the scoring module 340 retrieves the entity score from the entity database 310. If the scoring module 340 determines that an entity included in the free-form media input seed lacks an associated entity score, the scoring module 340 assigns an entity score to the entity. In one embodiment, the scoring module 340 randomly assigns an entity score to the entity. For example, when the entities "morning" and "September" were initially received by the content server 120, the scoring module 340 may have respectively assigned the entity scores of 0.3 and 0.8 to "morning" and "September."

The playlist generation module 350 generates media playlists. In one embodiment, the playlist generation module 330 receives the entities extracted from the free-form media input seed and generates a separate media playlist for each entity. The playlist generation module 350 generates a media playlist for an entity by retrieving media items stored in the media database 320 that are associated with the entity according to the media item scores. Thus, if a seed has multiple entities, the playlist generation module 350 generates multiple media playlists where each media playlist is associated with a corresponding one of the entities extracted from the free-form media input seed. In one embodiment, the playlist generation module 350 may also rank each media item included in each entity's associated media playlist based on the media item score for the media item that describes the media item's relevance to the entity.

The playlist generation module 350 may also add media items to an entity's associated media playlist that are not associated with the entity in the media database 320. To add the media items, the playlist generation module 350 identifies media features of one or more media items already related to the entity in the media database 320. The playlist generation module 350 then identifies other media items in the media database 320 that have the same or similar media features (e.g., musicological features) as the one or more media items related to the entity. The fact that the other media items have matching media features as the media items that are already associated with the entity may indicate that the other media items are likely to also be related to the entity.

If the playlist generation module 350 receives an entity for which the media database 350 lacks any related media items, the playlist generation module 350 may use one or more different techniques to identify media items for the entity's media playlist. In one example, the playlist generation module 350 may notify one or more people associated with the content server 120 of the absence of media items for the entity. These people may then manually select media items from the media database 320 to include in the media playlist responsive to the notification. In one embodiment, the media items that are manually selected are given media item scores describing each media item's relevance to the entities in the entity database 310. The playlist generation module 350 then creates the media playlist for the entity based on the selected media items.

In another example, the playlist generation module 350 randomly selects media items for inclusion in the media playlist for the entity such as the most popular media items in content server 120. In yet another example, the playlist generation module 350 may identify media items that include the entity in the title of the media items or in the lyrics of the media items. For example, the playlist generation module 350 may identify media items with the entity "September" in the lyrics of the media items or in the title of the media items. The playlist generation module 350 then identifies media features (e.g., musicological features) for the identified media items and determines a correlation between the media features and the entity. That is, the playlist generation module 350 determines a media item score for the media items that include the entity in the title of the media items or in the lyrics of the media items. In one embodiment, the playlist generation module 350 determines a media item score for an identified media item according to whether the media features of the identified media item match media features of other media items known to be related to the entity in the media database 320. The playlist generation module 350 determines whether to add the media item to the playlist for the entity based on the media item score for the media item. For example, if a media item's media item score is above a threshold, the playlist generation module 350 adds the media item to the entity's playlist. As will be described below with respect to the feedback module 370, subsequent user feedback from users can be used to refine the media item scores such that the content server 120 is self-learning.

In another example, the playlist generation module 350 transmits a query to the client device 100 of the user requesting that the user provide an example of an artist, genre, media item title, or album title that the user would expect to be included in the media playlist for the entity. The playlist generation module 350 may select media item titles for inclusion in the media playlist based on the response provided by the client device 100 of the user. In one embodiment, the playlist generation module 350 queries the client device of the user as a last resort if the playlist generation module 350 cannot identify media items for the entity's media playlist using the other techniques described above.

The merge module 360 combines (i.e., merges) the multiple media playlists respectively associated with the multiple entities in a free-form media input seed into a single media channel. The media channel includes at least a subset of media items from the different media playlists. In one embodiment, the merge module 360 calculates ranking scores for media items from the different media playlists where the ranking scores are the basis for combining the media playlists into a media channel for a user.

The ranking score of a media item indicates the relevance of the media item to the media channel that is created based on the free-form media input seed. For example, a first media item having a higher ranking score than a second media item is more relevant to the media channel than a second media item having a lower ranking score. In one embodiment, the merge module 360 calculates a ranking score for each media item based on a combination of the media item's media item score and the entity score of the entity associated with the media item. For example, the merge module 360 may multiply the media item's media item score with the associated entity's entity score to generate the ranking score for the media item.

The merge module 360 may also adjust the ranking scores of media items. For example, the merge module 360 may increase the ranking score of a media item that co-occurs in different media playlists that are created based on the free-form media input seed. The merge module 360 assumes that a media item is highly relevant to the free-form media input seed since the media item is included in different media playlists. In one embodiment, the merge module 360 identifies a media item that co-occurs in different media playlists that are generated based on entities included in a free-form media input seed. The merge module 360 increases the ranking score of the identified media item based on the ranking scores of the media item with respect to the entities corresponding to the different media playlists that include the media item. To increase the ranking score, the merge module 360 may add the different ranking scores of the media item to establish the ranking score for the media item. For example, consider a song that is included in both the media playlist for the entity "morning" and the media playlist for the entity "September." The merge module 360 calculates the ranking score for the song by adding the ranking score of the song with respect to the entity "morning" and the ranking score of song with respect to the entity "September."

The merge module 360 may also increase or decrease the ranking score of a media item based on known musicological preferences of the user that requested the media channel. The merge module 360 may identify media items included in the different media playlists that have media features that match the musicological features that the user prefers and increases the ranking scores for the media items accordingly. The merge module 360 increases the ranking scores for the media items since there is a higher likelihood that the user will enjoy the media items given that the user has a preference for the media features of the media items. Conversely, the merge module 360 may identify media items having media features that the user dislikes and decreases the ranking score for the media items. The merge module 360 decreases the ranking scores since there is since there is a likelihood that the user will not enjoy the media items given that the user dislikes the media features of the media items.

In one embodiment, the merge module 360 ranks the media items for the media channel based on the ranking scores for the media items. That is, the merge module orders the media items included in the different media playlists. By ranking the media items, the merge module 360 creates a ranked list of all the media items from the different media playlists.

The merge module 360 selects media items for the media channel associated with the free-form media input seed from the ranked list of media items. In one embodiment, the merge module 360 selects a threshold number of the media items to include in the media channel based on the rank. For example, the merge module 360 may select the top 400 media items to include in the media channel to provide to the client device 100. In one embodiment, the merge module 360 may re-rank the media items for the media channel based on user feedback as will be further described below.

The feedback module 370 collects feedback information from the client devices 100. The feedback module 370 maintains the collected feedback information from the client devices 100 for each user. The stored feedback information includes express feedback information and implicit feedback information that are associated with presentations of the media items to the users such as the media items included in a media channel for a free-form media input seed. The collected feedback indicates user preference information, such as express (e.g., thumbs up) and inferred preferences that indicate whether a user liked or disliked a media item during a presentation of the media item in a media channel based on a free-form media input seed.

The feedback module 370 analyzes the collected feedback to determine the users' preferences for media items (i.e., likes and dislikes) and the magnitudes of these preferences (i.e., the amount of the likes and dislikes) with respect to the media channel. In some embodiments, the feedback module 370 analyzes for a media item a series of collected feedback for that media item to determine a user's preference for the media item with respect to the media channel. In one embodiment, the feedback module 370 represents the preferences and magnitudes as a preference score. Note, for each user, each media item in each media channel has its own preference score. For example, the preference score may be represented as a value between −1 and 1, where a negative value indicates dislike and a positive value indicates like, and the absolute value indicates the magnitude of the like or dislike. To compute the score, the feedback module 370 assigns weights to the various types of feedback that may be present in the user preference information. Very strong signals of preference (e.g., an express thumbs up or thumbs down) are afforded relatively higher weights, while weaker signals of preference such as the various types of implicit feedback are afforded relatively lower weights. The weighted feedback is then combined to produce the preference score.

As described above, the media item score for a media item describes the media item's relevance to a particular entity. In one embodiment, the feedback module 370 calculates the media item score for each media item based on the preference scores for the media item across all users who interacted with the media item in a media channel(s) that is generated based at least in part on the entity. For example, the feedback module 370 may calculate a normalized average of the preference scores across the different users to establish the media item score for the media item with respect to an entity. The feedback module 370 also adjusts the media item scores for a media item with respect to different entities in the entity database as the feedback module 370 receives user feedback indicative of positive or negative preference for the media item when the media item is provided in media channels associated with the different entities over time.

In one embodiment, the feedback module 370 adjusts the entity scores for entities scored in the entity database 310. As mentioned previously, the scoring module 340 assigns an entity score to an entity when the entity is initially received. Over time, media items that are associated with the entity receive user feedback indicative of positive or negative preference for the media items. The feedback module 370 may adjust the entity score for the entity based on the user feedback for the media items. In one embodiment, the feedback module 370 may increase the entity score for an entity if the feedback module 370 determines that a threshold number of positive preferences are received from users for media items included in a media channel that is associated with an entity. Conversely, the feedback module 370 may lower the entity score for an entity if the scoring module 340 determines that a threshold number of negative preferences are received from users for media items included in the media channel that is associated with the entity. In one embodiment, the scoring module 340 may maintain the initial entity score assigned to an entity if enough feedback is not received so as to make a determination whether to adjust the entity score. By updating the media item scores and entity scores based on received user feedback on media items provided in media channels, the feedback module 370 can update both the media item scores and entity scores to improve future media channels as the playlist generation module 350 takes into account the media item scores and entities scores when calculating ranking scores for the media items.

Figure 4:
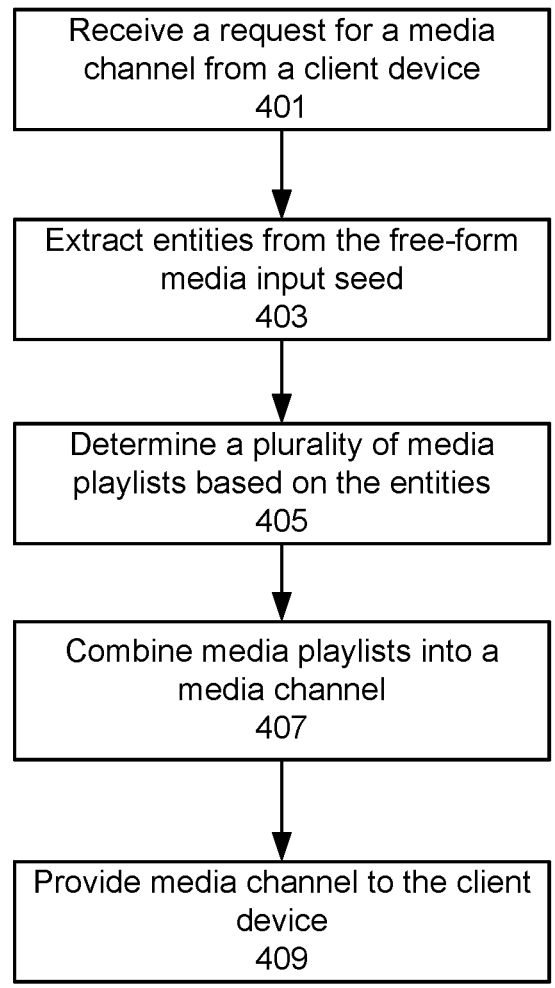
FIG. 4 is a flowchart illustrating a process of providing a media playlist based on a free-form media input seed received from a client device according to one embodiment.

FIG. 4 is a flowchart illustrating a process for generating a media channel based on a free-form media input seed according to one embodiment. In one embodiment, the process of FIG. 4 is performed by the content server 120. Other entities may perform some or all of the steps of the process in other embodiments. Likewise, embodiments may include different and/or additional steps, or perform the steps in different orders.

The content server 120 receives 401 a request for a media channel from a client device 100 where the request includes a free-form media input seed. The free-form media input seed may include one or more ambiguous entities, but may also include a valid entity. An example of a free-form media input seed received from the client device is "morning music in September."

The content server 120 extracts 403 entities from the free-form media input seed. For example, the content server 120 may extract the ambiguous entities "morning" and "September" from the free-form media input seed. The content server 120 determines 405 a plurality of media playlists based on the extracted entities where each media playlist is associated with a corresponding one of the extracted entities. For example, the content server 120 may generate a media playlist for each of the ambiguous entities "morning" and "September." Each media playlist includes one or more media items. The content server 120 combines 407 the media items from the media playlists into a media channel. The content server 120 provides 409 the media channel to the client device 100 so that the client device 100 can stream the media items included in the media channel to the user.

Figure 5:
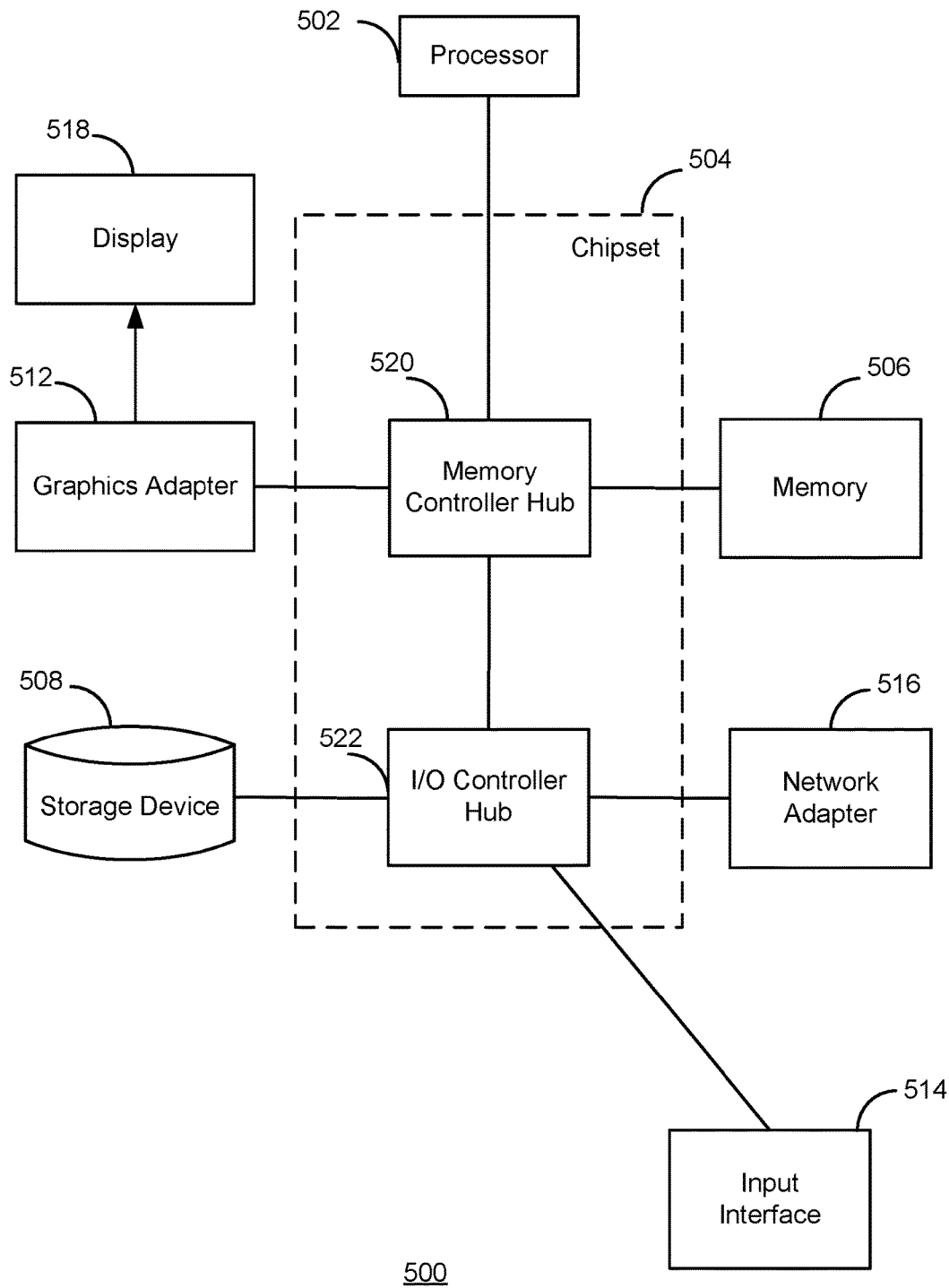
FIG. 5 is a high-level block diagram illustrating an example computer for implementing the entities shown in FIG. 1.

Turning now to a discussion of the implementation of client device 100 and/or the content server 120, FIG. 5 is a high-level block diagram illustrating an example computer 500 for implementing the entities shown in FIG. 1. The computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, an input device 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The input interface 514 is a touch-screen interface, a mouse, track ball, or other type of pointing device, a keyboard, or some combination thereof, and is used to input data into the computer 500. In some embodiments, the computer 500 may be configured to receive input (e.g., commands) from the input interface 514 via gestures from the user. The graphics adapter 512 displays images and other information on the display 518. The network adapter 516 couples the computer 500 to one or more computer networks.

The computer 500 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 508, loaded into the memory 506, and executed by the processor 502.

The types of computers 500 used by the entities of FIG. 1 can vary depending upon the embodiment and the processing power required by the entity. For example, the content server 120 can run in a single computer 500 or multiple computers 500 communicating with each other through a network such as in a server farm. The computers 500 can lack some of the components described above, such as graphics adapters 512, and displays 518.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for selecting content based on correlations between preferred media features and specific configurations of environmental information. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method for generating a media channel including a plurality of media items, comprising:

storing a set of media items, each media item stored with a predetermined plurality of media item scores, each media item score for the media item describing a magnitude of the media item's relevance to a distinct ambiguous entity term from a set of ambiguous entity terms;

storing a plurality of predetermined entity scores, each entity score associated with a corresponding ambiguous entity term from the set of ambiguous entity terms and describing an importance of the corresponding ambiguous entity term in media input seeds;

receiving a request for a media channel from a client device of a user, the request including a textual free-form media input seed that comprises a plurality of ambiguous entity terms input by the user, wherein an ambiguous entity term of the plurality of ambiguous entity terms does not identify an entity within a set of valid entity types related to the set of media items, the valid set of entity types having meaning within a music context and the valid set of entity types including a musicological feature;

identifying, for each ambiguous entity term from the plurality of ambiguous entity terms input by the user, a plurality of media items that are correlated with the ambiguous entity term from the set of media items, the correlation of a media item to an ambiguous entity term based on the media item's predetermined media item score indicating a magnitude of the media item's relevance to the ambiguous entity term;

generating, for each ambiguous entity term, a media playlist to generate a plurality of media playlists, each media playlist including the identified plurality of media items that are correlated with the ambiguous entity term;

calculating ranking scores for the identified plurality of media items included in the plurality of media playlists, a ranking score for a media item from the identified plurality of media items based on a stored entity score for the ambiguous entity term that is associated with the media playlist that includes the media item and the media item's media item score indicating a magnitude of the media item's relevance to the ambiguous entity term;

ranking the identified plurality of media items based on the calculated ranking scores; and combining the plurality of media playlists for the plurality of ambiguous entity terms included in the textual free-form media input seed into the media channel by selecting a subset of the identified plurality of media items to include in the media channel based on the ranking; and providing the media channel to the client device.

2. The computer-implemented method of claim 1, wherein generating the media playlist further comprises:

identifying musicological features of a media item in the media playlist;

identifying other media items having musicological features matching the musicological features of the media item in the media playlist; and adding the identified other media items to the media playlist.

3. The computer-implemented method of claim 1, wherein calculating the ranking scores comprises:

identifying a co-occurring media item that is included in multiple ones of the plurality of media playlist;

calculating a ranking score for the co-occurring media item based on entity scores respectively describing importances of the ambiguous entities associated with the multiple ones of the plurality of media playlists in which the co-occurring media item is included and media item scores indicating magnitudes of the co-occurring media item's relevance to the ambiguous entities associated with the multiple ones of the plurality of media playlists in which the co-occurring media item is included.

4. The computer-implemented method of claim of claim 1, further comprising:

receiving user feedback on the subset of the identified plurality of media items provided in the media channel;

adjusting entity scores of the plurality of ambiguous entity terms and media item scores of the subset of the identified plurality of media items according to the user feedback;

adjusting the ranking scores for the subset of the identified plurality of media items based on the adjusted entity scores and the adjusted media item scores;

updating the ranking of the subset of the identified plurality of media items based on the adjusted ranking scores; and selecting another subset of the identified plurality of media items to include in the media channel based on the updated ranking.

5. A non-transitory computer-readable storage medium storing executable computer program instructions for generating a media channel including a plurality of media items, the instructions executable to perform steps comprising:

storing a set of media items, each media item stored with a predetermined plurality of media item scores, each media item score for the media item describing a magnitude of the media item's relevance to a distinct ambiguous entity term from a set of ambiguous entity terms;

storing a plurality of predetermined entity scores, each entity score associated with a corresponding ambiguous entity term from the set of ambiguous entity terms and describing an importance of the corresponding ambiguous entity term in media input seeds;

receiving a request for a media channel from a client device of a user, the request including a textual free-form media input seed that comprises a plurality of ambiguous entity terms input by the user, wherein an ambiguous entity term of the plurality of ambiguous entity terms does not identify an entity within a set of valid entity types related to the set of media items, the valid set of entity types having meaning within a music context and the valid set of entity types including a musicological feature;

identifying, for each ambiguous entity term from the plurality of ambiguous entity terms input by the user, a plurality of media items that are correlated with the ambiguous entity term from the set of media items, the correlation of a media item to an ambiguous entity term based on the media item's predetermined media item score indicating a magnitude of the media item's relevance to the ambiguous entity term;

generating, for each ambiguous entity term, a media playlist to generate a plurality of media playlists, each media play list including the identified plurality of media items that are correlated with the ambiguous entity term;

calculating ranking scores for the identified plurality of media items included in the plurality of media playlists, a ranking score for a media item from the identified plurality of media items based on a stored entity score for the ambiguous entity term that is associated with the media playlist that includes the media item and the media item's media item score indicating a magnitude of the media item's relevance to the ambiguous entity term;

ranking the identified plurality of media items based on the calculated ranking scores; and combining the plurality of media playlists for the plurality of ambiguous entity terms included in the textual free-form media input seed into the media channel by selecting a subset of the identified plurality of media items to include in the media channel based on the ranking; and providing the media channel to the client device.

6. The non-transitory computer-readable storage medium of claim 5, wherein generating the media playlist further comprises:

identifying musicological features of a media item in the media playlist;

identifying other media items having musicological features matching the musicological features of the media item in the media playlist; and adding the identified other media items to the media playlist.

7. The non-transitory computer-readable storage medium of claim 5, wherein calculating the ranking scores comprises:

identifying a co-occurring media item that is included in multiple ones of the plurality of media playlist; and calculating a ranking score for the co-occurring media item based on entity scores respectively describing importances of the ambiguous entities associated with the multiple ones of the plurality of media playlists in which the co-occurring media item is included and media item scores indicating magnitudes of the co-occurring media item's relevance to the ambiguous entities associated with the multiple ones of the plurality of media playlists in which the co-occurring media item is included.

8. The non-transitory computer-readable storage medium of claim 5, wherein the instructions are executable to perform further steps comprising:

receiving user feedback on the subset of the identified plurality of media items provided in the media channel;

adjusting entity scores of the plurality of ambiguous entity terms and media item scores of the subset of the identified plurality of media items according to the user feedback;

adjusting the ranking scores for the subset of the identified plurality of media items based on the adjusted entity scores and the adjusted media item scores;

updating the ranking of the subset of the identified plurality of media items based on the adjusted ranking scores; and selecting another subset of the identified plurality of media items to include in the media channel based on the updated ranking.

9. A device for generating a media channel including a plurality of media items, comprising:

a processor configured to execute modules; and a memory storing the modules, the modules executable by the processor to perform steps comprising:

storing a set of media items, each media item stored with a predetermined plurality of media item scores, each media item score for the media item describing a magnitude of the media item's relevance to a distinct ambiguous entity term from a set of ambiguous entity terms;

storing a plurality of predetermined entity scores, each entity score associated with a corresponding ambiguous entity term from the set of ambiguous entity terms and describing an importance of the corresponding ambiguous entity term in media input seeds;

receiving a request for a media channel from a client device of a user, the request including a textual free-form media input seed that comprises a plurality of ambiguous entity terms input by the user, wherein an ambiguous entity term of the plurality of ambiguous entity terms does not identify an entity within a set of valid entity types related to the set of media items, the valid set of entity types having meaning within a music context and the valid set of entity types including a musicological feature;

identifying, for each ambiguous entity term from the plurality of ambiguous entity terms input by the user, a plurality of media items that are correlated with the ambiguous entity term from the set of media items, the correlation of a media item to an ambiguous entity term based on the media item's media item score indicating a magnitude of the media item's relevance to the ambiguous entity term;

generating, for each ambiguous entity term, a media playlist to generate a plurality of media playlists, each media play list including the identified plurality of media items that are correlated with the ambiguous entity term;

calculating ranking scores for the identified plurality of media items included in the plurality of media playlists, a ranking score for a media item from the identified plurality of media items based on a stored entity score for the ambiguous entity term that is associated with the media playlist that includes the media item and the media item's media item score indicating a magnitude of the media item's relevance to the ambiguous entity term;

ranking the identified plurality of media items based on the calculated ranking scores; and combining the plurality of media playlists for the plurality of ambiguous entity terms included in the textual free-form media input seed into the media channel by selecting a subset of the identified plurality of media items to include in the media channel based on the ranking; and providing the media channel to the client device.

10. The device of claim of claim 9, wherein generating the playlist further comprises:

identifying musicological features of a media item in the media playlist;

identifying other media items having musicological features matching the musicological features of the media item in the media playlist; and adding the identified other media items to the media playlist.

11. The device of claim 10, wherein calculating the ranking scores comprises:

identifying a co-occurring media item that is included in multiple ones of the plurality of media playlist; and calculating a ranking score for the co-occurring media item based on entity scores respectively describing importances of the ambiguous entities associated with the multiple ones of the plurality of media playlists in which the co-occurring media item is included and media item scores indicating magnitudes of the co-occurring media item's relevance to the ambiguous entities associated with the multiple ones of the plurality of media playlists in which the co-occurring media item is included.

12. The computer-implemented method of claim 1, further comprising:

identifying, for at least one ambiguous entity term, a media item that includes the ambiguous entity term in lyrics of the media item.

13. The computer-implemented method of claim 1, further comprising:

identifying, for at least one ambiguous entity term, a media item that includes the ambiguous entity term in a title of the media item.

14. The computer-implemented method of claim 1, wherein identifying, for each ambiguous entity term a plurality of media items that are correlated with the ambiguous entity term comprises:

identifying for each ambiguous entity term, media items from the stored set of media items having media item scores for the ambiguous entity term that are above a threshold.

15. The computer-implemented method of claim 1, wherein a first media item from the identified plurality of media items is associated with a first ambiguous entity term input by the user that has a higher entity score than a second ambiguous entity term input by the user that is associated with a second media item from the identified plurality of media items, and
   wherein the first media item is ranked higher in the media channel than the second media item.

* * * * *

UNITED STATES PATENT AND TRADEMARK OFFICE
CERTIFICATE OF CORRECTION

PATENT NO. : 10,368,114 B2
APPLICATION NO. : 15/210721
DATED : July 30, 2019
INVENTOR(S) : Bieschke Page 1 of 1

It is certified that error appears in the above-identified patent and that said Letters Patent is hereby corrected as shown below:

In the Claims

In Column 13, Claim 4, Line 49, delete "of claim of claim" and insert -- of claim --, therefor.

In Column 16, Claim 10, Line 23, delete "of claim of claim" and insert -- of claim --, therefor.

Signed and Sealed this
Seventh Day of January, 2020

Andrei Iancu
*Director of the United States Patent and Trademark Office*